(12) United States Patent
Haddock et al.

(10) Patent No.: US 9,588,396 B2
(45) Date of Patent: Mar. 7, 2017

(54) LASER PATTERNING OF CONDUCTIVE FILMS FOR ELECTRO-ACTIVE LENSES

(71) Applicant: Mitsui Chemicals, Inc., Tokyo (JP)

(72) Inventors: Joshua N. Haddock, Roanoke, VA (US); Charles Willey, Roanoke, VA (US)

(73) Assignee: Mitsui Chemicals, Inc., Tokyo (JP)

( * ) Notice: Subject to any disclaimer, the term of this patent is extended or adjusted under 35 U.S.C. 154(b) by 347 days.

(21) Appl. No.: 13/761,827

(22) Filed: Feb. 7, 2013

(65) Prior Publication Data

US 2013/0208347 A1 Aug. 15, 2013

Related U.S. Application Data

(60) Provisional application No. 61/595,720, filed on Feb. 7, 2012.

(51) Int. Cl.
G02F 1/29 (2006.01)
G02C 7/08 (2006.01)

(52) U.S. Cl.
CPC .............. *G02F 1/29* (2013.01); *G02C 7/083* (2013.01); *Y10T 83/0341* (2015.04)

(58) Field of Classification Search
CPC .......... A61C 19/004; A61N 2005/0652; B23K 26/0096; B23K 26/0639; B23K 26/423
USPC ................................................. 359/300–309
See application file for complete search history.

(56) References Cited

U.S. PATENT DOCUMENTS

| | | | |
|---|---|---|---|
| 5,124,836 A | 6/1992 | Kikuchi | |
| 6,219,126 B1 | 4/2001 | Von Gutfeld | |
| 7,268,850 B2 | 9/2007 | Liao | |
| 7,609,557 B2 | 10/2009 | Aritome | |
| 7,654,667 B2 | 2/2010 | Blum et al. | |
| 8,317,321 B2 | 11/2012 | Haddock et al. | |
| 2004/0125247 A1 | 7/2004 | Seshan et al. | |

(Continued)

FOREIGN PATENT DOCUMENTS

| | | |
|---|---|---|
| EP | 2 431 790 A1 | 3/2012 |
| JP | 5576323 | 6/1980 |

(Continued)

OTHER PUBLICATIONS

International Search Report and the Written Opinion for International Application No. PCT/US2013/025119, European Patent Office, Netherlands, mailed on May 7, 2013.

(Continued)

*Primary Examiner* — Bumsuk Won
*Assistant Examiner* — Tamara Y Washington
(74) *Attorney, Agent, or Firm* — Sterne, Kessler, Goldstein & Fox P.L.L.C.

(57) ABSTRACT

Systems and methods for manufacturing electro-active lenses including a peripheral edge, a discrete electro-active region, and at least two substrates. The at least two substrates include a layer of a transparent conductive material, that is laser cut to isolate regions required for establishing an electrical connection between the peripheral edge of the lens, from regions not required for establishing an electrical connection. Isolating the regions of the transparent conductive material required for establishing an electrical connection may include cutting patterns around an electrode of each of the substrates. The regions not required for establishing an electrical connection may be further cut into sections, which may be substantially band-shaped.

20 Claims, 9 Drawing Sheets

(56) References Cited

U.S. PATENT DOCUMENTS

| | | |
|---|---|---|
| 2005/0231677 A1 | 10/2005 | Meredith |
| 2006/0092340 A1 | 5/2006 | Blum et al. |
| 2006/0126698 A1 | 6/2006 | Blum et al. |
| 2007/0109489 A1 | 5/2007 | Nomura et al. |
| 2007/0159562 A1 | 7/2007 | Haddock |
| 2007/0216862 A1 | 9/2007 | Blum et al. |
| 2007/0242173 A1 | 10/2007 | Blum et al. |
| 2008/0123048 A1 | 5/2008 | Volk |
| 2009/0015785 A1 | 1/2009 | Blum et al. |
| 2009/0256977 A1 | 10/2009 | Haddock et al. |
| 2010/0002190 A1 | 1/2010 | Clarke et al. |
| 2010/0265456 A1 | 10/2010 | Matsui |

FOREIGN PATENT DOCUMENTS

| | | |
|---|---|---|
| JP | 3-263014 | 11/1991 |
| JP | 756177 | 3/1995 |
| JP | 2009-523263 A | 6/2009 |
| JP | 2010-284897 A | 12/2010 |
| WO | WO 2007/081959 A2 | 7/2007 |
| WO | 2007/146265 | 12/2007 |
| WO | WO 2008/103906 A2 | 8/2008 |
| WO | WO 2009/120757 A1 | 10/2009 |
| WO | WO 2009/126946 A1 | 10/2009 |

OTHER PUBLICATIONS

U.S. Appl. No. 61/595,720, filed Feb. 7, 2012.
European Search Report in EP 11193376 application.
The International Search Report and Written Opinion corresponding to the PCT/US09/40300 application.
U.S. Appl. No. 12/166,526, filed Jul. 2, 2008.
U.S. Appl. No. 12/118,226, filed May 9, 2008.
U.S. Appl. No. 12/246,543, filed Oct. 7, 2008.
U.S. Appl. No. 12/135,587, filed Jun. 9, 2008.
U.S. Appl. No. 12/042,643, filed Mar. 3, 2008.
U.S. Appl. No. 12/101,264, filed Apr. 11, 2008.
U.S. Appl. No. 12/018,048, filed Jan. 22, 2008.
U.S. Appl. No. 12/054,313, filed Mar. 24, 2008.
Fowler et al., "Liquid crystal lens review", Ophthal. Physiol. Opt., 1990, vol. 10, pp. 186-194.

LASER PATTERNING OF CONDUCTIVE FILMS FOR ELECTRO-ACTIVE LENSES

CROSS-REFERENCES TO RELATED APPLICATIONS

This application claims benefit under 35 U.S.C. §119(e) of U.S. provisional patent application No. 61/595,720, filed on Feb. 7, 2012, the entire disclosure of which is incorporated herein by reference for all purposes.

This application is related to U.S. patent application Ser. No. 12/408,973, published as U.S. 2009/0256977, the entire disclosure of which is incorporated herein by reference for all purposes.

BACKGROUND OF THE INVENTION

Electro-active lenses generally include a liquid optical material (e.g., liquid crystal) encapsulated or contained by one or more solid, transparent optical materials. Conventional methods and structures for containing the liquid optical material often result in a visible seal ring on the lens indicating the positioning of the liquid optical material. These visible seal rings are cosmetically undesirable to consumers.

In conventional liquid crystal displays (LCDs), sealing features can typically be hidden behind an opaque frame or bezel. Such structures, however, are not viable for ophthalmic lenses and spectacle lenses in particular.

To date, methods and structures designed to reduce the visibility of any liquid optical material seal in an ophthalmic lens often compromise the structural integrity of the lens. As such, conventional methods for processing such lenses (e.g., conventional methods for cutting and edging a lens) can cause containment of the liquid optical material to be disturbed and can also disrupt the ability to alter the refractive index of the liquid optical material electronically. Consequently, many prior art electro-active lenses are not commercially viable products.

To address some of the foregoing problems, the inventors previously disclosed methods for manufacturing an electro-active semi-finished lens product, such as in U.S. Pat. Pub. No. 2009/0256977, incorporated herein by reference. Such methods may include the deposition of transparent, thin conductive films and electrodes onto ophthalmic quality substrates to enable the activation of the electro-active optic contained within the semi-finished lens blank.

Exploded views of the thin film coatings which may be used to produce an electro-active semi-finished lens blank (EASFB) are shown in FIGS. 1 and 2. In those examples, further details of which are discussed below, the electrodes are in physical contact with the thin conductive layers (in this case Indium Tin Oxide, ITO) and may be deposited/applied either immediately before (FIG. 1), or immediately after (FIG. 2), the ITO is deposited/applied.

Previous efforts, such as mentioned above, have included masking the deposition of ITO over a finite region of the substrate opposite of the electrodes to reduce the risk of electrical shorting. An example of this is shown in FIG. 3. While masking the deposition of ITO may achieve the desired goal of reducing electrical shorting, the inventors have found that it has a drawback in that the non-uniformity of the coatings may be highly visible in a finished lens, especially one that has been AR coated. This non-uniform appearance of the lens will be unacceptable in a commercially product.

BRIEF SUMMARY OF THE INVENTION

Aspects of the present invention provide electro-active optical elements that include a peripheral edge, a discrete electro-active region, and at least two substrates that each include a layer of a transparent conductive material, and methods for manufacturing the same. In embodiments, lenses including the described structures, and/or formed according to the disclosed methods may include cuts in a transparent conductive layer, that electrically isolate regions of one or more conductive layers, and that are substantially unnoticeable to someone looking at and/or through the lens.

As used herein, "electrically isolated" may be understood as substantially isolating conductive elements so as to prevent shorting during normal operation of a given device.

As used herein, an electro-active lens product can be a lens, which may further be an unfinished lens blank, a semi-finished lens blank, a finished lens blank, an edged lens, a contact lens, an intra-ocular lens, or a corneal inlay.

According to first aspects of the invention, a method of manufacturing an electro-active lens product including a peripheral edge, a discrete electro-active region, and at least two substrates, each of the at least two substrates including a layer of a transparent conductive material, may include one or more of isolating regions of the transparent conductive material required for establishing an electrical connection between the peripheral edge and the electro-active region from regions of the transparent conductive material not required for establishing an electrical connection by cutting the transparent conductive material, and/or cutting regions not required for establishing an electrical connection between the peripheral edge and the electro-active region to restrict electrical conductivity between an upper peripheral edge of the lens and a lower peripheral edge of the lens.

In embodiments, the cutting may be laser cutting. The cuts may have a width of, for example, less than 1 mm, less than 0.5 mm, or less than 0.1 mm. The cuts may have a minimum width of, for example, at least 0.1 µm. The cuts may have a width in a range of, for example, 0.1 µm to 1 mm, 0.1 µm to 0.5 mm, or 0.1 µm to 0.1 mm.

In embodiments, the isolating of regions of the transparent conductive material required for establishing an electrical connection may include cutting a plurality of intersecting lines. The plurality of intersecting lines may include, for example, at least one substantially straight line and at least one curved line, and various combinations thereof.

In embodiments, cutting regions not required for establishing an electrical connection may include cutting at least one of the regions into a plurality of sections. In embodiments, the plurality of sections may be, for example, substantially band shaped, or similar shapes.

Embodiments may further include substantially uniformly depositing the transparent conductive material prior to said cutting.

Embodiments may further include forming at least one of the substrates to comprise a surface relief diffractive element, or other optical elements.

In embodiments, the lens may be an electro-active ophthalmic lens, an unfinished lens blank, a semi-finished lens blank, a finished lens blank, an edged lens, a contact lens, an intra-ocular lens, or a corneal inlay.

According to further aspects of the invention, an electro-active lens product may be provided including a peripheral edge, a discrete electro-active region, and at least two substrates, each of the at least two substrates including a layer of a transparent conductive material, and the electro-active optical element may be formed by a process including at least one of isolating regions of the transparent conductive material required for establishing an electrical connection between the peripheral edge and the electro-active region from regions of the transparent conductive material not required for establishing an electrical connection by laser cutting the transparent conductive material, and laser cutting regions not required for establishing an electrical connection between the peripheral edge and the electro-active region to restrict electrical conductivity between an upper peripheral edge of the lens and a lower peripheral edge of the lens.

According to yet further aspects of the invention, an electro-active lens product may include a peripheral edge, a discrete electro-active region, and at least two substrates, each of the at least two substrates including a layer of a transparent conductive material, wherein, regions of said transparent conductive material required for establishing an electrical connection between said peripheral edge and said electro-active region are isolated from regions of said transparent conductive material not required for establishing an electrical connection by laser cutting, and/or regions not required for establishing an electrical connection between said peripheral edge and said electro-active region are further laser cut to restrict electrical conductivity between an upper peripheral edge of the lens and lower peripheral edge of the lens.

In embodiments, the lens product may further include an additional electrode structure on each substrate in physical contact with its respective layer of transparent conductive material and whose ends are exposed along said peripheral edge.

In embodiments, at least one of the substrates of the lens product may include a surface relief diffractive element.

In embodiments, the cutting may be laser cutting. The cuts may have a width of, for example, less than 1 mm, less than 0.5 mm, or less than 0.1 mm. The cuts may have a minimum width of, for example, at least 0.1 µm. The cuts may have a width in a range of, for example, 0.1 µm to 1 mm, 0.1 µm to 0.5 mm, or 0.1 µm to 0.1 mm.

According to yet further aspects of the invention, an method of manufacturing an electro-active lens product including a peripheral edge, an electro-active region, and at least a first and second substrate each including a layer of a transparent conductive material, may include laser cutting the layer of transparent conductive material of the first substrate into a first pattern including a plurality of sections, and laser cutting the layer of transparent conductive material of the second substrate into a second pattern including a plurality of sections.

In embodiments, the plurality of sections may be substantially band shaped, or other similar shapes.

In embodiments, the first substrate may be a spherical plano substrate and/or the second substrate may includes a surface relief diffractive element.

The invention disclosed herein may allow for the customization of eyeglass lenses to a multitude of different patient's prescriptions, shaped (by edging) to fit a multitude of different styles of eyeglass frames, different sizes of eyeglass frames and being able to be switched in tint transmission such that a small battery having the proper form factor can be used without detracting from the cosmetic appearance of the fashionable eyeglass frames that are available today. The invention disclosed herein may allow for the fabrication of an electro-active semi-finished lens blank, that is capable of, for example, surfacing, polishing or free forming/digitally surfacing into the patient's specific eyeglass prescription.

In addition, embodiments of the invention may provide lenses that can be edged into the shape of the specific fashionable electronic eyeglass frame picked out by the consumer/patient using conventional available equipment. Exemplary lens products may be mounted into the specific fashionable electronic eyeglass frame in such a manner without detracting from the cosmetic appearance of the eyeglass frame. Exemplary lens products may also be driven off of a miniature battery which can be integrated into an electronic fashionable eyeglass frame without detracting from the comfort or aesthetics of the fashionable eyeglass frame.

Lens products according to aspects of the invention may be incorporated in clip-on, or other lens systems, that include integrated and/or modular electronics. Such electronics may include by way of example only, controller, processor, power source, switch, sensor, transmitter, receiver, transceiver, light, filter, microphone, camera, display, transparent electrodes, etc. The power source can be one or more of by way of example only, a solar cell or cells, a fuel cell, a battery. The switch can be, by way of examples only, that of a capacitance switch, a touch switch, a manual on/off switch.

In embodiments, the lenses may include a first electrode and a second electrode, which may be transparent electrode layers, and/or third and fourth electrodes, which may extend substantially from a perimeter of the lens product toward a center of the lens product in plan view.

In embodiments, the electronics contained in the lens product, may include one or more of: controller, processor, power source, switch, sensor, transmitter, receiver, transceiver, light, filter, microphone, camera, display, transparent electrodes, etc. The power source may be one or more of by way of example only, a solar cell or cells, a fuel cell, a battery. The switch can be, by way of examples only, that of a capacitance switch, a touch switch, a manual on/off switch.

In embodiments, a thick electrode configuration may be used to establish edge connectivity to a thin electrodes of the electro-active cell.

According to yet further aspects of the invention, a semi-finished lens blank having an electro-active cell may be provided in which the lens blank is capable of being processed into a prescription lens, edged and mounted into a frame, with the ability to make electrical contact to electronics residing in the frame of eyeglasses or spectacles.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

DETAILED DESCRIPTION OF THE INVENTION

Figure 1:
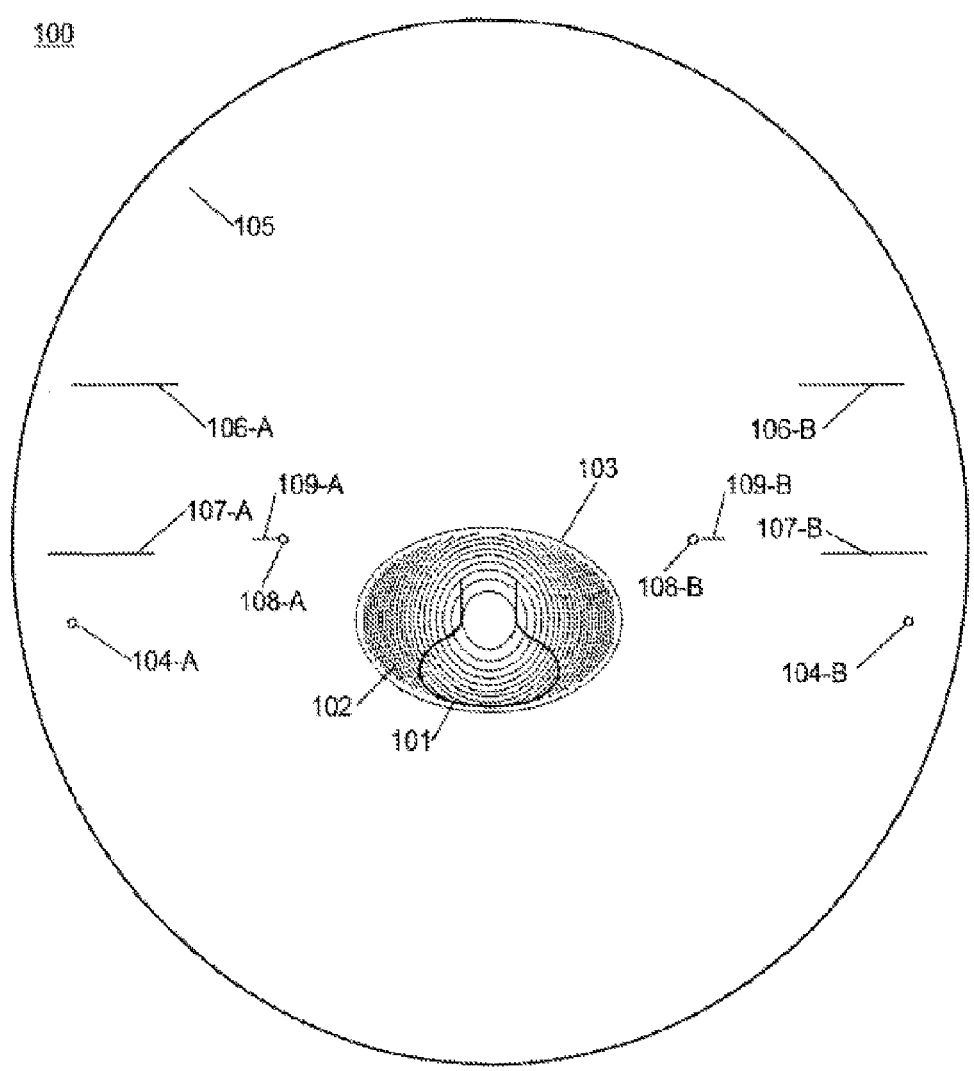
FIG. 1 illustrates an electro-active semi-finished lens blank (EASFLB) in accordance with an aspect of the present invention.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a finger" is a reference to one or more fingers and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

Some terms that are used herein are described in further detail as follows:

As used herein, the term "alignment layer" may refer to a layer of material that controls the alignment of liquid crystals in the absence of an external field and often adheres to the surface of a substrate (such as an electrode, a lens, lens blank, lens wafer, etc.).

As used herein, the term "approximately" may refer to plus or minus 10 percent, inclusive. Thus, the phrase "approximately 10 mm" may be understood to mean from 9 mm to 11 mm, inclusive.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim or to describe an embodiment. For instance, in describing a method, "comprising" indicates that the claim is open-ended and allows for additional steps. In describing a device, "comprising" may mean that a named element(s) may be essential for an embodiment, but other elements may be added and still form a construct within the scope of a claim. In contrast, the transitional phrase "consisting of" excludes any element, step, or ingredient not specified in a claim. This is consistent with the use of the term throughout the specification.

As used herein, a "conductive path" refers to a continuous path for which electrons (i.e. current) may flow from one point to another. The conductive path may comprise one component, or more than one component. For instance, a conductive path may comprise portions of a lens housing, a temple, a hinge, a lens, and/or conductive material disposed between (or within) some or all of the components.

As used herein, "coupled" may refer to any manner of connecting two components together in any suitable manner, such as by way of example only: attaching (e.g. attached to a surface), disposing on, disposing within, disposing substantially within, embedding within, embedded substantially within, etc. "Coupled" may further comprise fixedly attaching two components (such as by using a screw, an adhesive, or embedding a first component into a second component during a manufacturing process), but does not so require. Two components may be coupled temporarily simply by being in physical contact with one another. Two components are "electrically coupled" or "electrically connected" if current can flow from one component to another. That is, the two components do not have to be in direct contact such that current flows from the one component directly to the other component. There may be any number of other conductive materials and components disposed electrically between two components "electrically coupled" so long as current can flow there between.

As used herein, a "diffractive element" may refer to a diffractive pattern that may be disposed on the surface of a substrate such as, by way of example only, etching, grinding or molding the surface. Such an optic may comprise a physical structure which is patterned to have a fixed optical power and/or aberration correction, by way of a surface relief diffractive topological profile.

As used herein, a "dynamic lens" may refer to a lens with an optical power which is alterable with the application of electrical energy, mechanical energy or force. Either the entire lens may have an alterable optical power, or only a portion, region or zone of the lens may have an alterable optical power. The optical power of such a lens is dynamic or tunable such that the optical power can be switched between two or more optical powers. The switching may comprise a discrete change from one optical power to another (such as going from an "off" or inactive state to an "on" or active state) or it may comprise continuous change from a first optical power to a second optical power, such as by varying the amount of electrical energy to a dynamic element (e.g. tunable). One of the optical powers may be that of substantially no optical power. A dynamic lens may also be referred to as a dynamic optic, a dynamic optical element, a dynamic optical zone, dynamic power zone, or a dynamic optical region.

As used herein, a "frame" may refer to a complete wearable housing that secures both spectacle lenses and aligns them in the proper place relative to the wearer's eyes when being worn. The frame may comprise elements such as a first and second temple, a lens housing that is configured to support the spectacle lenses, one or more hinges, and any other related component.

As used herein, the term "layer" does not require a uniform thickness of material. For example, a layer may comprise some imperfections or uneven thicknesses so long as the layer performs its intended purpose.

As used herein, a "lens" may refer to any device or portion of a device that causes light to converge or diverge. The device may be static or dynamic. A lens may be refractive or diffractive. A lens may be concave, convex or plano on one or both surfaces. A lens may be spherical, cylindrical, prismatic or a combination thereof. A lens may be made of optical glass, plastic or resin. A lens may also be referred to as an optical element, an optical zone, an optical region, an optical power region or an optic. It should be noted that within the optical industry a lens can be referred to as a lens even if it has zero optical power. Moreover, a lens may refer to both intra-ocular and extra-ocular components.

As used herein, a "lens blank" may refer to an optical material that may be shaped into a lens. A lens blank may be finished meaning that the lens blank has been shaped to have an optical power on both external surfaces. A lens blank may be semi-finished meaning that the lens blank has been shaped to have an optical power on only one external surface. A lens blank may be unfinished meaning that the lens blank has not been shaped to have an optical power on either external surface. A surface of an unfinished or semi-finished lens blank may be finished by means of a fabrication process known as free-forming or by more traditional surfacing and polishing.

As used herein, a "lens housing" may refer to a part of the frame that is configured or adapted to support or hold the first and the second lenses in place (preferably firmly in place). The lens housing may also comprise the part of the frame to which the temples attach. The lens housing may comprise any component or material adapted to support the lenses, including, for example, screws, nylon monofilament, eye-wire, etc. or any combination thereof. The lens housing may comprise any material, including metal or plastic. A lens housing may be included in any type of frame design, including fully rimmed, semi-rimless, and rimless. In some embodiments, the lens housing may also include the bridge, such as when the lens housing comprising a single component or two components that support both the first and the second lens.

As used herein, a "multi-focal lens" may refer to a lens having more than one focal point or optical power. Such lenses may be static or dynamic. Examples of static multi-focal lenses include a bifocal lens, trifocal lens or a Progressive Addition Lens. Examples of dynamic multifocal lenses include electro-active lenses whereby various optical powers may be created in the lens depending on the types of electrodes used, voltages applied to the electrodes and index of refraction altered within a thin layer of liquid crystal. Multifocal lenses may also be a combination of static and dynamic. For example, an electro-active element may be used in optical communication with a static spherical lens, static single vision lens, and static multifocal lens such as, by way of example only, a Progressive Addition Lens.

As used herein, "optical communication" may refer to the condition whereby two or more optics of given optical power are aligned in a manner such that light passing through the aligned optics experiences a combined optical power equal to the sum of the optical powers of the individual elements.

As used herein, an "ophthalmic lens" may refer to a lens suitable for vision correction, which may include a spectacle lens, a contact lens, an intra-ocular lens, a corneal in-lay, and a corneal on-lay.

As used herein, a "progressive addition region" or "progressive addition zone" may refer to a lens having a first optical power in a first portion of the region and a second optical power in a second portion of the region wherein a continuous change in optical power exists there between. For example, a region of a lens may have a far viewing distance optical power at one end of the region. The optical power may continuously increase in plus power across the region, to an intermediate viewing distance optical power and then to a near viewing distance optical power at the opposite end of the region. After the optical power has reached a near-viewing distance optical power, the optical power, may decrease in such a way that the optical power of this progressive addition region transitions back into the far viewing distance optical power. A progressive addition region may be on a surface of a lens or embedded within a lens. When a progressive addition region is on the surface and comprises a surface topography it may be known as a progressive addition surface.

As used herein, a "substrate" is a component that is generally well-known in the field of optics. A substrate typically refers to the component of a lens that is first fabricated or provided, and on which additional layers or materials may be deposited. A substrate may have dimensions on the order of millimeters or fractions of millimeters, whereas coatings and other deposited layers on the substrate typically have dimensions (i.e. thicknesses) that are on the order of microns. Examples of substrates may include, for example, lens blanks, semi-finished lens-blanks, or lens wafers.

In general, composite lenses comprise two or more substrates that may include one or more elements or layers of material disposed between the substrates (or in some instances, the composite lens may consist essentially of two substrates, typically with different optical features (such as refractive index) or physical features (such as density, hardness, etc.). Examples of composite lenses include electro-active and/or electro-chromic semi-finished lens blanks (SFB), which may contain an upper substrate (e.g. a "Lid") and a bottom substrate (which may comprise a diffractive element or pixelated electrodes). The substrates are typically held together by an adhesive (such as a resin material) among several other layers (for example, the adhesive may be disposed directly on the substrate, or may be disposed over one or more layers of material that are also disposed over the substrate). An example of a composite lens in the form of an electro-active lens is shown in FIG. 1.

FIG. 1 illustrates an electro-active semi-finished lens blank (EASFLB) 100 in accordance with an aspect of the present invention. The EASFLB 100 can comprise a first substrate (e.g., a top substrate) and a second substrate (e.g., a bottom substrate). FIG. 1 depicts a top view of the EASFLB 100. Accordingly, FIG. 1 shows a view of the top substrate of the EASFLB 100.

As depicted in FIG. 1, the EASFLB 100 can comprise a progressive addition optical power region 101 in optical communication with a dynamic, electro-active, diffractive optical power region 102. The dynamic, electro-active, diffractive optical power region 102 can comprises an electro-active material such as, for example, a cholesteric liquid crystalline (CLC) material. The electro-active material can be encapsulated within a volume by the two bounding substrates (i.e., the top and bottom substrates of the EASFLB 100) and an electroactive material seal feature 103.

The dynamic, electro-active, diffractive optical power region 102 is shown as having an oval shape but is not so limited. The dynamic, electro-active, diffractive optical power region 102 can be of any shape (e.g., round, flat-topped, semi-circle, etc.) and can be blended as described in U.S. patent application Ser. No. 12/166,526, filed Jul. 2, 2008, which is hereby incorporated by reference in its entirety.

FIG. 1 shows the progressive addition optical power region 101 overlapping or positioned within a boundary defined by the dynamic, electro-active, diffractive optical power region 102 for purposes of illustration only. The positioning of the progressive addition optical power region 101, however, is not so limited. Overall, the progressive addition optical power region 101 and the dynamic, electro-active, diffractive optical power region 102 can be positioned in any orientation with respect to one another. To that end, any or all portions of the progressive addition optical power region 101 can overlap any or all portions of the dynamic, electro-active, diffractive optical power region 102. This enables the progressive addition optical power region 101 to extend beyond the boundary defined by the dynamic, electro-active, diffractive optical power region 102 while still overlapping a substantial portion of the dynamic, electro-active, diffractive optical power region 102.

An adhesive can adhere the two substrates of the EASFLB 100 together and can be applied, for example, as a coating or via one or more optional fill ports 104. The adhesive can be contained in a volume determined by the bounding substrates of the EASFLB 100 (i.e., the top and bottom substrates), and the electroactive material seal feature 103. The refractive index of the adhesive can be substantially equal to the refractive indices of one or more of the bounding substrates of the EASFLB 100. The electro-active material seal feature 103 can be considered to be an electro-active material seal structure 103.

Electrical contacts 106 and 107 can allow a voltage to be applied to the dynamic, electroactive, diffractive optical power region 102 so as to allow activation of the dynamic, electro-active, diffractive optical power region 102. Electrical contact can be made between the electrical contacts 106 and 107 and the dynamic, electro-active, diffractive optical power region 102 via transparent conductors (not shown). The electrical contacts 106 and 107 can be applied to the inner surfaces of the two bounding substrates and can therefore be embedded within the EASFLB 100. However, it is noted that various embodiments, such as those described further below, may include different electrode structures than those shown in FIG. 1.

Semi-visible fiducial marks 108 and 109 can be included on and/or in the EASFLB 100 to act as guiding or alignment marks during manufacture of the EASFLB 100 (i.e., to aid in manufacturing the EASFLB 100). The semi-visible fiducial marks 108 and 109 can be located on the anterior surfaces of the bounding substrates for example.

Figure 2:
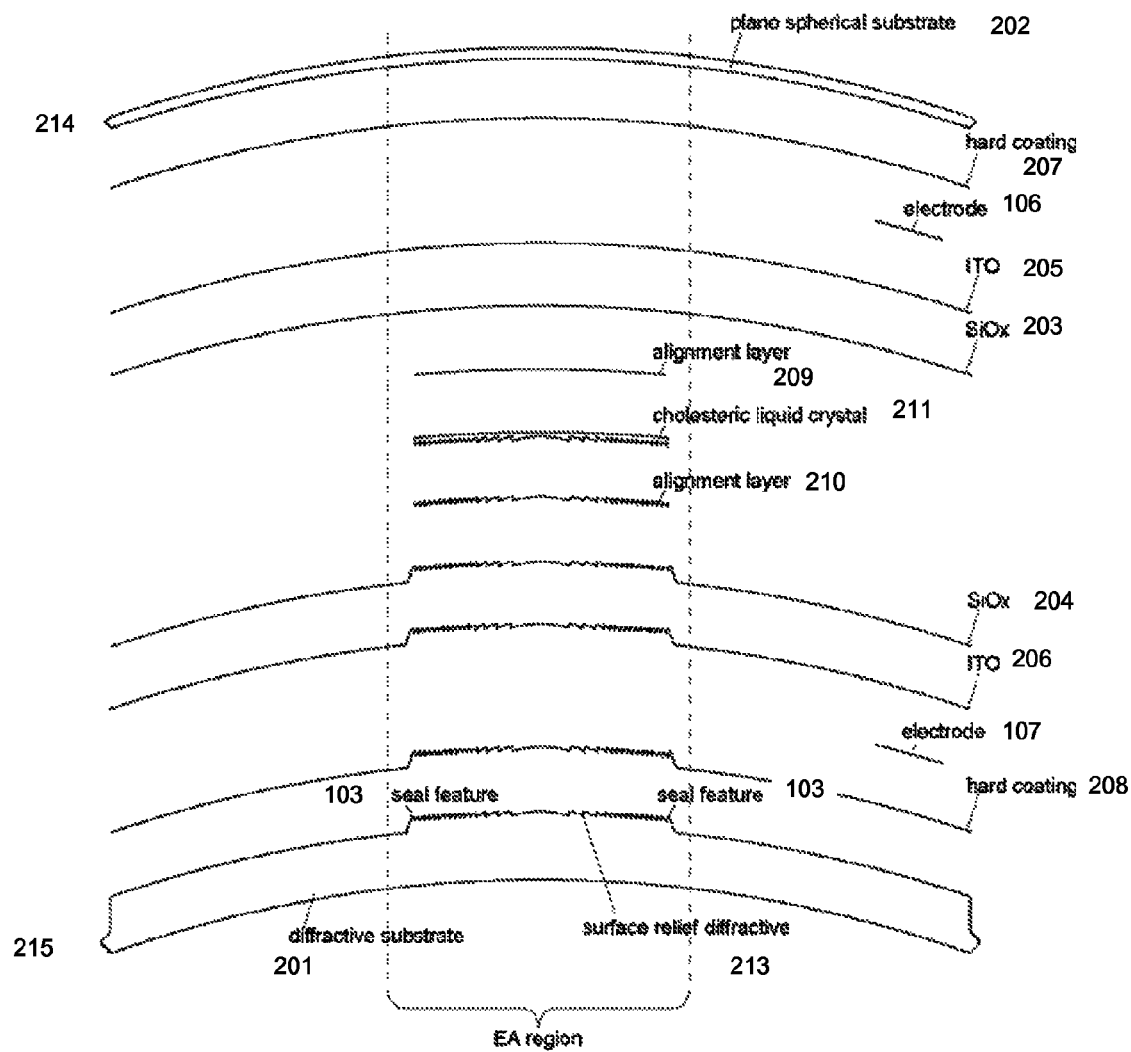
FIG. 2 illustrates an exploded cross-sectional view of the EASFLB depicted in FIG. 1.

An exploded cross-sectional view of the EASFLB 100 (not to scale) is shown in FIG. 2. The EASFLB 100 can be constructed from the aforementioned bounding substrates—in particular, a back substrate 201 and a front substrate 202. The back substrate 201 can be thicker than the front substrate 202. The back substrate 201 can comprise any lens material.

As an example, the back substrate 201 can comprise a material having a refractive index of 1.67 such as Mitsui MR-10. The front substrate 202 can also comprise any lens material. As an example, the front substrate 202 can comprise the same lens material as the back substrate 201 (e.g., the front substrate 202 can comprise MR-10 material). Alternatively, the front substrate 202 can comprise a different lens material (e.g., the back substrate 201 can comprise Trivex® having a refractive index of 1.53. As will be appreciated by one skilled in the relevant arts, the features and characteristics of the front substrate 202 and the back substrate 201 can be interchanged in accordance with an aspect of the present invention.

The front substrate 202 and the back substrate 201 can have any desired thickness. As an example, the thickness of the back substrate 201 can be between 5.0 mm and 10.0 mm while the thickness of the front substrate 202 can be between 0.5 mm and 2.0 mm. The anterior, convex surface of the back substrate 201 can contain the electro-active material seal feature 103, and a surface relief diffractive structure 213.

The surface relief diffractive structure 213, when in physical and optical communication with an electro-active material, can be designed to generate a phase retardation of $m2\pi$. where m is an integer. In accordance with an aspect of the present invention, m can be equal to one (1).

For large values of m (e.g., m>5), chromatic aberration may be reduced and the surface relief diffractive structure 213 may be characterized as a multi-order surface relief diffractive structure. Accordingly, the surface relief diffractive structure 213 can be implemented as a multi-order surface relief diffractive structure as described in U.S. patent application Ser. No. 12/118,226, filed on May 9, 2008, which is hereby incorporated by reference in its entirety.

The anterior, convex surface of back substrate 201 can also comprise additional semi-visible fiducial marks (shown in FIG. 1) for the purpose of aiding the manufacturing process.

The posterior, concave surface of the back substrate 201 can be substantially featureless. After assembly of the EASFLB 100, the posterior, concave surface of the back substrate 201 can be further processed to form a final ophthalmic lens for a patient. For example, the posterior, concave surface of the back substrate 201 can be edged, cut and/or free-formed in accordance with a patient's vision prescription. In particular, a progressive addition optical power region can be free-formed onto the posterior, concave surface of the back substrate 201. This can obviate generation (e.g., either by mold or by free-forming) of the progressive addition optical power region 101 on the front substrate 202. Alternatively, a progressive addition optical power region can be formed on both the front substrate 202 and the back substrate 201 (e.g., either by mold or by free-forming). This can allow the progressive addition optical power region 101 to be of a lower power design, thereby lowering the total amount of unwanted astigmatism introduced by the progressive addition optical power regions of the EASFLB 100.

The anterior, convex surface of the front substrate 202 can comprise the progressive optical power region 101 and the semi-visible fiducial marks (both shown in FIG. 1) while the concave surface of the front substrate 202 can be substantially featureless. The front substrate 202 can also comprise the optional adhesive fill ports 104. The adhesive fill ports 104 can be through-holes that are between 1.0 mm and 2.0 mm in diameter. The adhesive fill ports 104 can be drilled or machined into the front substrate 202 or can be formed by other suitable means (e.g., by mold). Alternatively or in addition thereto, the back substrate 201 can comprise the adhesive fill ports 104.

The edge of the back substrate 201 can contain a bevel 215 to aid in the handling of the back substrate 201 during manufacture and assembly of the EASFLB 100. The edge of the front substrate 202 can also contain a bevel 214 to aid in the handling of the front substrate 202 during manufacture and assembly of the EASFLB 100.

Additional layers and structures can be applied to the convex surface of the back substrate 201 and to the concave surface of the front substrate 202 to allow operation of the dynamic, electro-active, diffractive optical power region 102. First layers 203 and 204 can any transparent material that is electrically insulating. As an example, the layers 203 and 204 can comprise SiOx (e.g., SiO2 or SiO3). Each of the layers 203 and 204 can have a thickness of 20 nm for example.

Adjacent each of the layers 203 and 204, a conductive material can be patterned into fine wires to form the electrical contacts 106 and 107. However, it is noted that certain embodiments of the invention may forego electrical contacts such as 106 and 107, as discussed further below. Transparent conductor layers 205 and 206 can be deposited in contact with the 203, 204. Each of the transparent conductor layers 205 and 206 can comprise a transparent conductive material such as Indium Tin Oxide (ITO) or Zinc Oxide (ZnO). The transparent conductor layers 205 and 206 can have a thickness of 20 nm for example. The transparent conductor layers 205 and 206 can be in electrical contact with the corresponding electrical contacts 106 and 107. The electrical contacts 106 and 107 can provide electrical contact to the dynamic, electro-active, diffractive optical power region 102 through the edge of the EASFLB 100.

One or more of the transparent conductor layers 106 and 107 can be deposited or formed to be patterned electrode structures (or pixelated structures) as described in U.S. patent application Ser. No. 12/246,543, filed on Oct. 7, 2008 and U.S. patent application Ser. No. 12/135,587, filed on Jun. 9, 2008, both of which are hereby incorporated by reference in their entirety. Such a patterned electrode structure can be used to form a desired diffractive pattern using a volume of electroactive material (e.g., electro-active material 211 contained in a space that need not rest on top of a diffractive relief structure).

Between the transparent conductor layers 205 and 206 and their respective substrates, hard coat layers 207 and 208 can be deposited. The final layers deposited can comprise liquid crystal alignment material layers 209 and 210 which act to align a volume of electro-active material 211 encapsulated within the EASFLB 100. The arrangement and thicknesses of the layers 203-210 maximizes luminous transmittance through the EASFLB 100 while minimizing electrical power consumption of the dynamic, electro-active, diffractive optical power region 102.

The surface relief diffractive structure 213, the electro-active material seal feature 103, and the layers and elements 203-211 can be considered to be an electro-active element of the EASFLB 100 (e.g., the dynamic, electro-active, diffractive optical power region 102). Any of the layers and elements 203-211 can be deposited across an entire area of the EASFLB 100 (e.g., the insulating layers 203 and 204) or can be deposited over less than an entire area of the EASFLB 100 or a portion of the entire area of the EASFLB 100 (e.g., the alignment layers 209 and 210). As described further below, in preferred embodiments, the ITO layers may be deposited substantially uniformly across the lens.

Further, the surface relief diffractive structure 213 and the electro-active material seal feature 103 can occupy any portion of the anterior, convex surface of the back substrate 201. Additionally, as will be appreciated by one skilled in the relevant arts, the surface relief diffractive structure (and associated electro-active material seal feature and adhesive seal feature for example) of the EASFLB 100 can be alternatively positioned on the front substrate 202. It should also be understood that the techniques described herein may be applicable to other optical elements besides those including a surface relief diffractive structure. For example, various electro-active optical elements may be included in lenses, which require electrical contact between an edge of the lens and the electro-active element. Connection to such elements may also be achieved as described herein.

As shown in FIG. 2, the dynamic, electro-active, diffractive optical power region 102 is shown as comprising multiple layers and elements of the EASFLB 100. Further, the dynamic, electro-active, diffractive optical power region 102 is shown as occupying a portion of an entire horizontal width of the EASFLB 100. As described further below, the EASFLB 100 can be further processed to form a finished lens blank or an edged lens (ready to be mounted into a spectacle frame). Overall, the arrangement of the layers of the EASFLB 100 can be varied as will be understood by one skilled in the relevant arts and as described in U.S. patent application Ser. No. 12/042,643, filed on Mar. 3, 2008, which is hereby incorporated by reference in its entirety.

Figure 3:
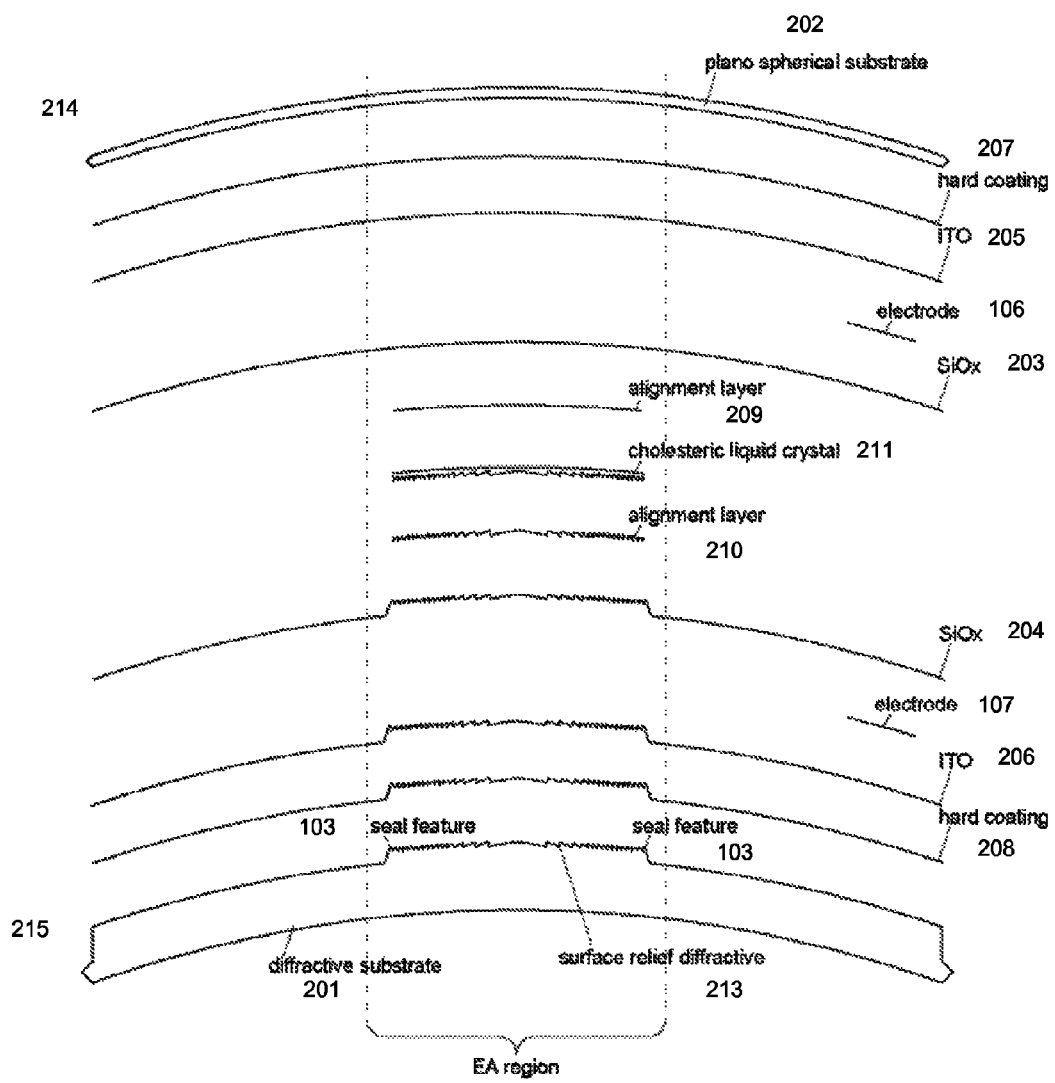
FIG. 3 illustrates an exploded cross-sectional view of another exemplary EASFLB.

Additionally, as shown in FIGS. 1-3, the electro-active material seal structure 103 can be positioned around the surface relief diffractive structure 213. That is, the electro-active material seal structure 103 can surround or enclose the surface relief diffractive structure 213.

Further, the electro-active material seal structure 103 can be formed to sit higher than the surface relief diffractive structure 213. The electro-active material seal structure 103 can be formed at the same time as forming the back substrate 201 or can be added to the back substrate 201 after formation of the surface relief diffractive structure 213.

As indicated in FIGS. 1-3, the electro-active material seal structure 103 can contain or encapsulate the electro-active material 211 (e.g., over the surface relief diffractive structure 213). Further, the electro-active material seal structure 103 can ensure the electro-active material 211 remains isolated from any adhesive positioned beyond the electro-active material seal structure 103. Lastly, the electro-active material seal structure 103 can be positioned so that portions of the EASFLB 100 can be subsequently removed (e.g., portions between the electro-active material seal structure 103 and the periphery of the EASFLB 100) without disturbing containment of the electro-active material 211 (e.g., leakage of the electro-active material 211).

In accordance with an aspect of the present invention, the various layers may be deposited and/or placed sequentially, or one or more layer assemblies may be joined together. In embodiments, the insulating layers 207 and 208 as well as the conductive layers 205 and 206 can be deposited over the entire area or surface of the substrates. In particular, the insulating layers 207 and 208 and the conductive layers 205 and 206 can be deposited in a substantially uniform manner, without patterning to reduce the visibility of any boundaries or edges. However, to reduce the possibility of electrical shorting between the front substrate 202 and the back substrate 201, the conductive layers 205 and 206 can be cut, such as by using laser cutting, to form isolated regions.

It should be noted that the layers in FIGS. 2 and 3 are not drawn to scale. Moreover, the layers shown are for illustration purposes only, and embodiments are not so limited and may include additional layers of materials (such as one or more alignment layers for the electro-active material that may comprise liquid crystals) and/or omit one or more of the layers shown in FIGS. 2 and 3. Moreover, although a preferred embodiment may comprise an electro-active lens (e.g. comprising an electro-active element), as noted above embodiments are not so limited.

As mentioned previously, methods for manufacturing an electro-active semi-finished lens blanks in which the electrodes are placed in physical contact with the thin conductive layers (in this case Indium Tin Oxide, ITO) may include applying the electrodes, e.g. 106, 107, either opposite the insulating layer (as in FIG. 2) or between the ITO and the insulating layer (as in FIG. 3). However, provision must be made to reduce the risk of electrical shorts between the ITO layers when a finished lens made from an EAFSLB is prepared to be mounted in a frame.

Figure 4:
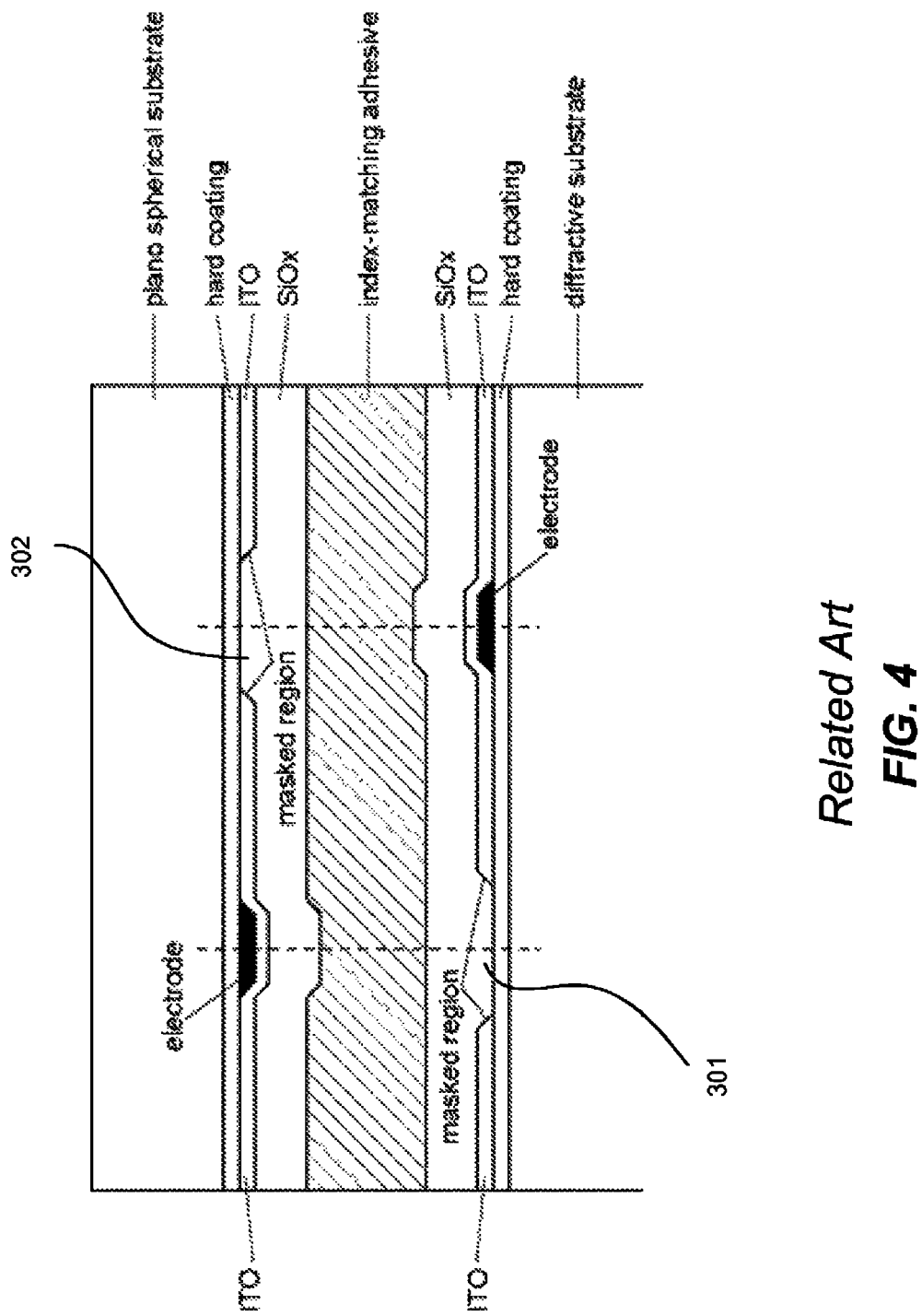
FIG. 4 shows a cross sectional view of a variable transmission lens product in which the ITO includes masked regions.

FIG. 4 shows a related art lens structure in which the ITO layer has been deposited to include masked regions 301, 302, where the ITO is absent. Although lenses such as shown in FIGS. 1-3 may be manufactured by masking the deposition of ITO over a finite region of the substrate opposite of the electrodes to reduce the risk of electrical shorting, such as shown in FIG. 4, this has the drawback in that the non-uniformity of the coatings is highly visible in a finished lens, especially one that has been AR coated.

As such, according to aspects of the invention, it is preferable to deposit layers and coatings uniformly over the surfaces of the substrate and then make provisions to reduce the risk of electrical shorts. One means to achieve this goal is to keep the electrodes of finite dimension, deposit the ITO and electrically insulating SiOx uniformly over the surfaces of the two substrates and then use a laser (or other fine cutting means) to cut through the ITO to isolate the regions where electrical conductivity is required.

For example, regions of the transparent conductive material required for establishing an electrical connection between the peripheral edge and the electro-active region may be isolated from regions of the transparent conductive material not required for establishing an electrical connection by cutting the transparent conductive material.

Embodiments may also include cutting regions not required for establishing an electrical connection between the peripheral edge and the electro-active region to restrict electrical conductivity, for example, between edges of the lens, such as an upper peripheral edge of the lens and a lower peripheral edge of the lens.

The inventors have found that cuts having a width of, for example, less than 1 mm, less than 0.5 mm, or less than 0.1 mm, are effective for these purposes. The cuts may have a minimum width of, for example, at least 0.1 µm, and still achieve the desired isolating. As such, the cuts may have a width in a range of, for example, 0.1 µm to 1 mm, 0.1 µm to 0.5 mm, or 0.1 µm to 0.1 mm. Further details regarding exemplary cutting patterns are described further below.

Figure 5:
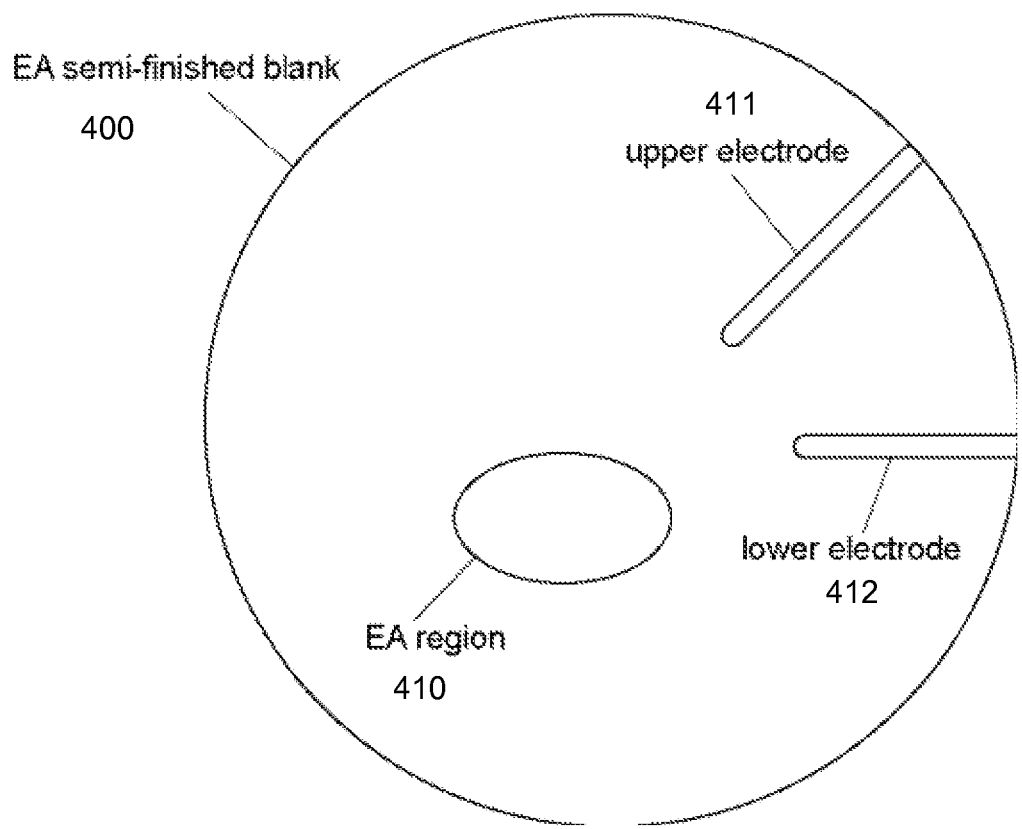
FIG. 5 shows a plan view of an exemplary assembled lens product in accordance with some embodiments of the invention.

FIG. 5 shows a plan view of an EA-SFB 400 with an EA region 410 and two electrodes 411, 412, where the upper electrode 411 is on the concave surface of the plano, spherical substrate, and the lower electrode 412 is on the convex surface of the diffractive substrate. The electrodes 411, 412 may take various forms, but in this embodiment, they extend generally toward a middle of the lens, or toward the EA region 410. The layers and electrode structures may be formed by various means including vapor deposition, direct printing, etc.

Figure 6:
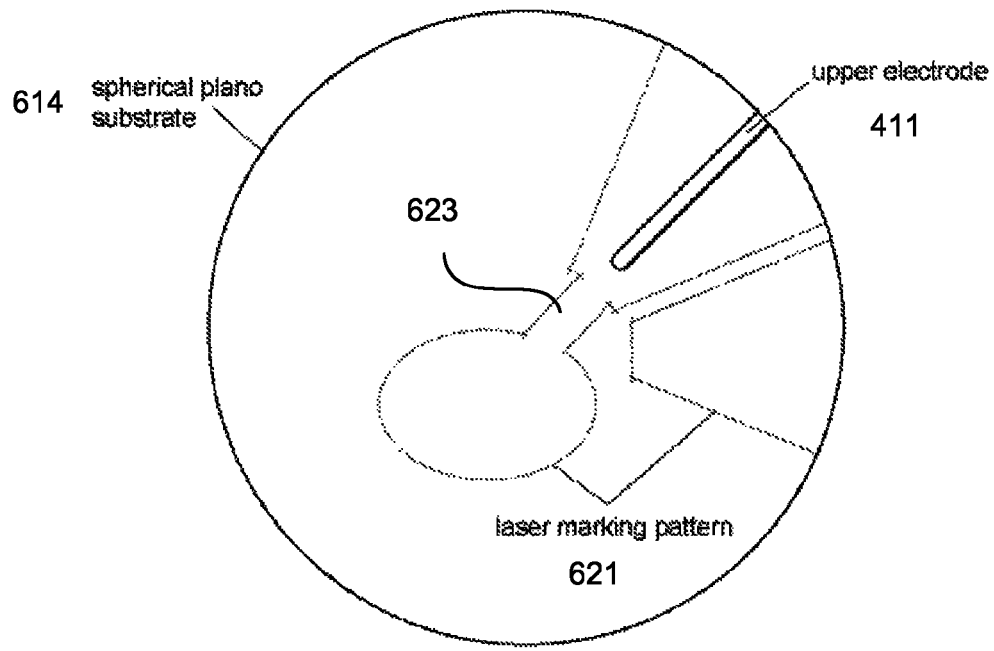
FIG. 6 shows a plan view of the substrates of the assembled lens product in FIG. 5 including cut lines according to aspects of the invention.
Figure 6:
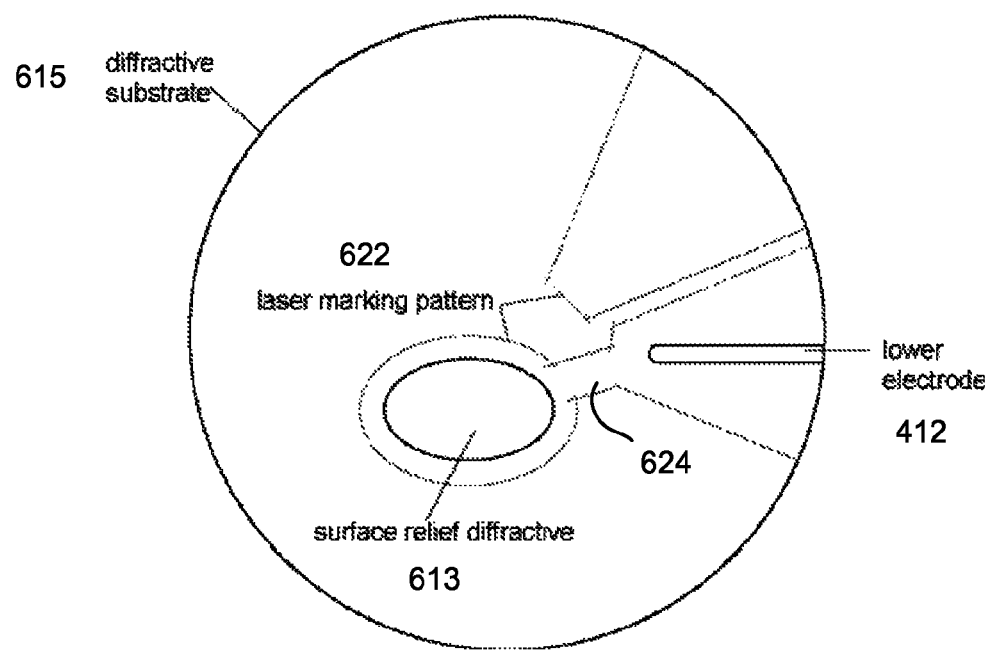

FIG. 6 shows the first (diffractive) substrate 615 and second (spherical plano) substrate 614, with the laser trimming patterns, cut through the ITO, for each substrate shown on them. In the embodiment shown in FIG. 6, the first substrate 615 includes a cut pattern 622 around the lower electrode 412 and surface relief diffractive 613. The region bounded by this portion of the pattern may be understood as a region of the transparent conductive material required for establishing an electrical connection between the peripheral edge and the electro-active region. Cut pattern 622 may also include an additional pattern around the area overlaid by the upper electrode 411. The cut pattern 622 includes a number of substantially straight cuts, as well as a curved cut around the surface relief diffractive 613. The intersections of some, or all, of the cuts may include an overlap to allow for easier processing (e.g. an increase in the tolerances for the cut pattern).

The second substrate 614 includes a cut pattern 621 around the upper electrode 411 and an area overlaying the surface relief diffractive 613. The region bounded by this portion of the pattern may be understood as a region of the transparent conductive material required for establishing an electrical connection between the peripheral edge and the electro-active region. Cut pattern 621 may also include an additional pattern around the area overlaying the lower electrode 412. The cut pattern 621 includes a number of substantially straight cuts, as well as a curved cut around the area overlaying surface relief diffractive 613. The curved cut may be, for example, elliptical, circular, or other shapes including at least one curved edge. The intersections of some, or all, of the cuts may include an overlap (e.g. by 0.1 mm, 0.5 mm, 1 mm, 2 mm and ranges in between) to allow for easier processing (e.g. an increase in the tolerances for the cut pattern, reduce tight turns or changes in direction, etc.).

It should be noted that the overlapping of the curved and straight line segments in the cut patterns shown in FIG. 6 are intentional and may help to ensure that the marking laser (or other cutting means) need not have to resolve tight corners, which can possibly result in not fully isolate the regions of ITO.

In the embodiments shown in FIG. 6, an area of reduced width (which may be referred to as a "channel") is present in at least some of the patterns isolating regions of the transparent conductive material required for establishing an electrical connection. For example, cut pattern 621 includes a channel 623 between the relatively larger areas bounding the upper electrode 411 and area overlaying the surface relief diffractive 613. Cut pattern 622 includes a channel 624 between the relatively larger areas bounding the lower electrode 412 and the surface relief diffractive 613. These relatively narrow channels may be useful, for example, in maintaining a desired separation of the conductive paths for the first and second substrates as they converge toward the middle of the lens.

Patterns such as those described above may be useful, for example, in isolating only those areas required for conduction within each substrate, as well as to ensure there are no shorts between substrates.

In preferred embodiments, the cut patterns such as shown in FIG. 6, as well as other patterns discussed further below, may be provided by laser cutting. As the laser can be focused to a spot well below 1 mm in diameter, the laser trimming pattern can be quite discrete and essentially invisible to the wearer. Commercially available laser marking systems such as the MD-V9900 series from Keyence Corporation have been successfully used by the inventors to cut through thin films of ITO.

Under some circumstances a patterning technique such as shown in FIG. 6 may provide sufficient electrical isolation, but in other circumstances, the inventors have found that additional measures may be required. Consider the cross section of the full rim metal electro-active lens frame shown in FIG. 7. In this frame primary electrical connection is made between conductive paint 710 on the edge of the lens 700, and a compliant conductive extrusion 712 within the eye-wire 714 of the frame. When a lens is mounted in such a frame the compressive forces, e.g. by groove 716, are much greater then when a lens is mounted in a semi-rimless or acetate frame (also described by the inventors) and the compliant conductive extrusion 712 can make electrical connection to the layers of ITO on the edge of the lens as well as to the conductive paint 710. Even if connection is made to the isolated regions of the ITO layers it can still form a conductive bridge between the top and bottom of the lens that can cause a short for the driving electronics, resulting in a non-functional lens.

The inventors have found that one means to solve this problem is to expand the cutting pattern to cut the isolated regions (e.g. into horizontal bands) such that even if connection is made to these areas, no electrical short can be generated. An exemplary pattern is shown in FIG. 8.

Figure 8:
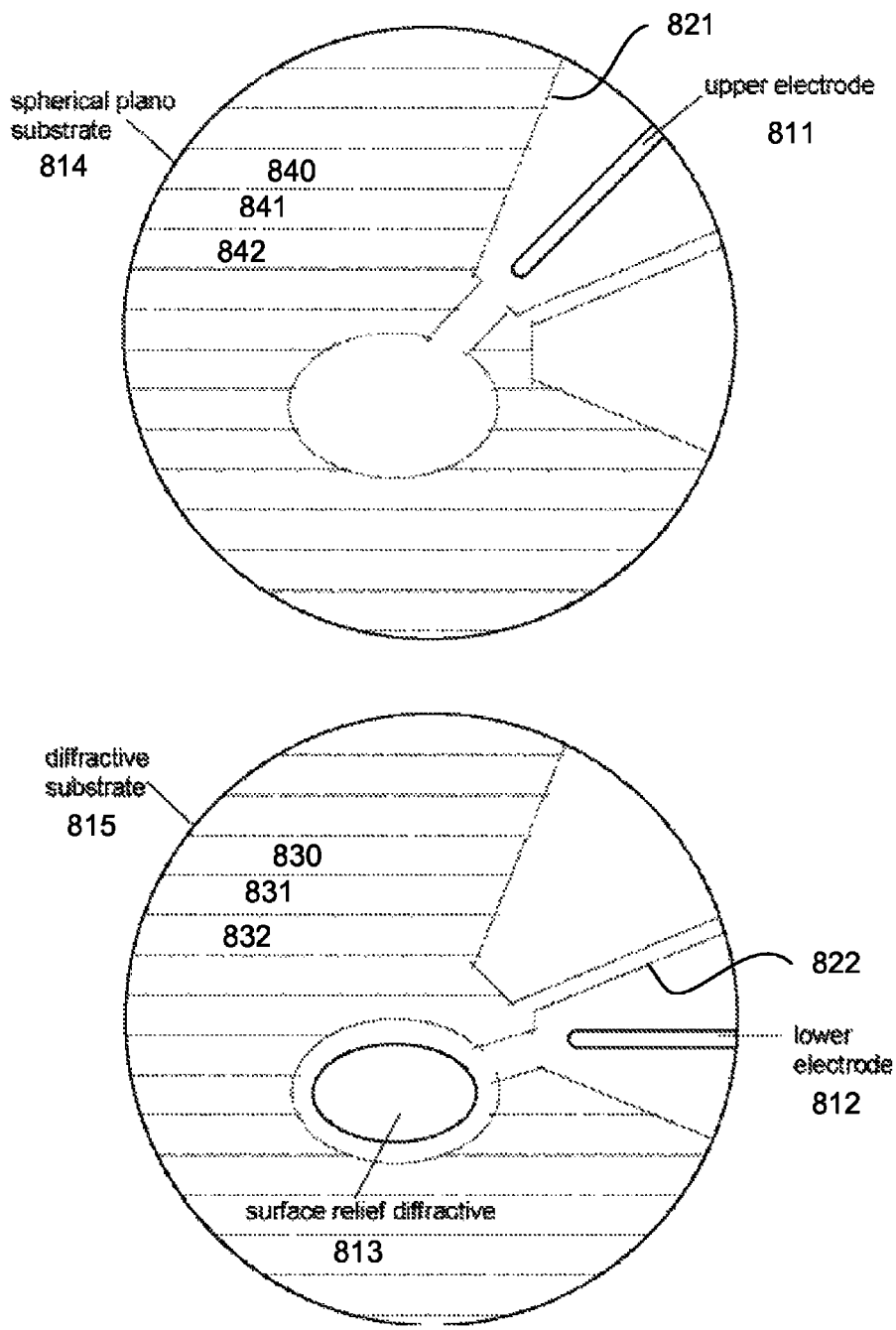
FIG. 8 shows a plan view of two substrates for a lens product including cut lines according to further aspects of the invention.

As with the patterns shown in FIG. 6, the example shown in FIG. 8 also includes cut patterns 821, 822 around electrodes 811, 812 (respectively) that isolate regions of the transparent conductive material required for establishing an electrical connection between the peripheral edge and the electro-active region. However, substrates 815, 814 further includes cut patterns through the ITO in regions not required for establishing an electrical connection. In the example shown in FIG. 8, these patterns may be substantially parallel lines, that isolate the regions not required for establishing an electrical connection into a plurality of band-shaped sections 840-842 etc., and 830-832 etc.

The cut patterns through the ITO in regions not required for establishing an electrical connection may overlap (e.g. by 0.1 mm, 0.5 mm, 1 mm, 2 mm and ranges in between) the other curved and straight cut segments, as discussed previously.

Figure 7:
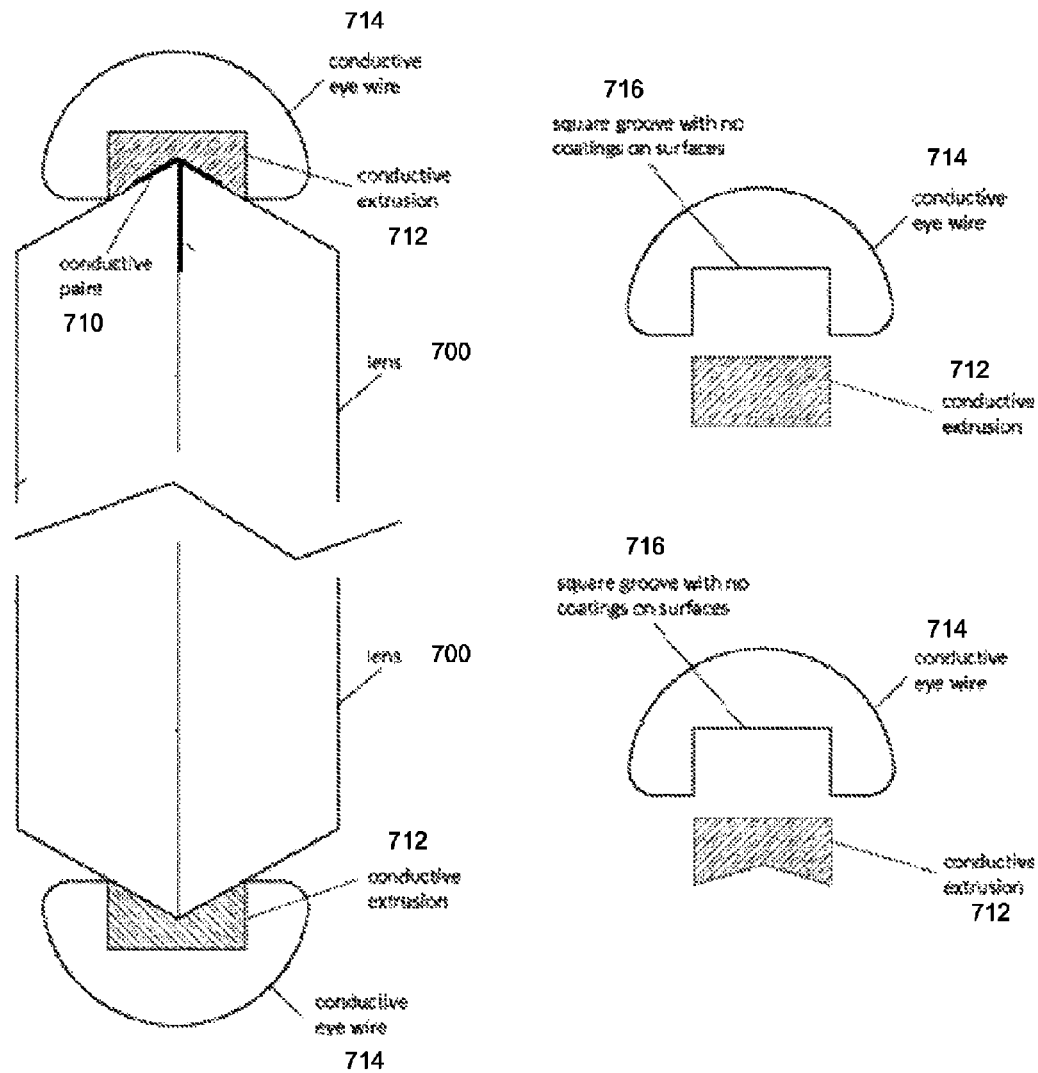
FIG. 7 shows a cross sectional view of an exemplary lens product including a conductive extrusion on an edge of the lens in accordance with some embodiments.

The inventors have further found that it may also be possible to exploit this "unwanted" electrical connection between the compliant conductive extrusion and the layers of ITO. For example, if the ITO is sufficiently conductive (e.g. sheet resistivity <1000 $\Omega/\mu m$ or other suitable value) then it may be possible to omit the electrodes altogether and establish electrical connection directly between the ITO layers and the compliant conductive extrusion, such as shown in FIG. 7.

Figure 9:
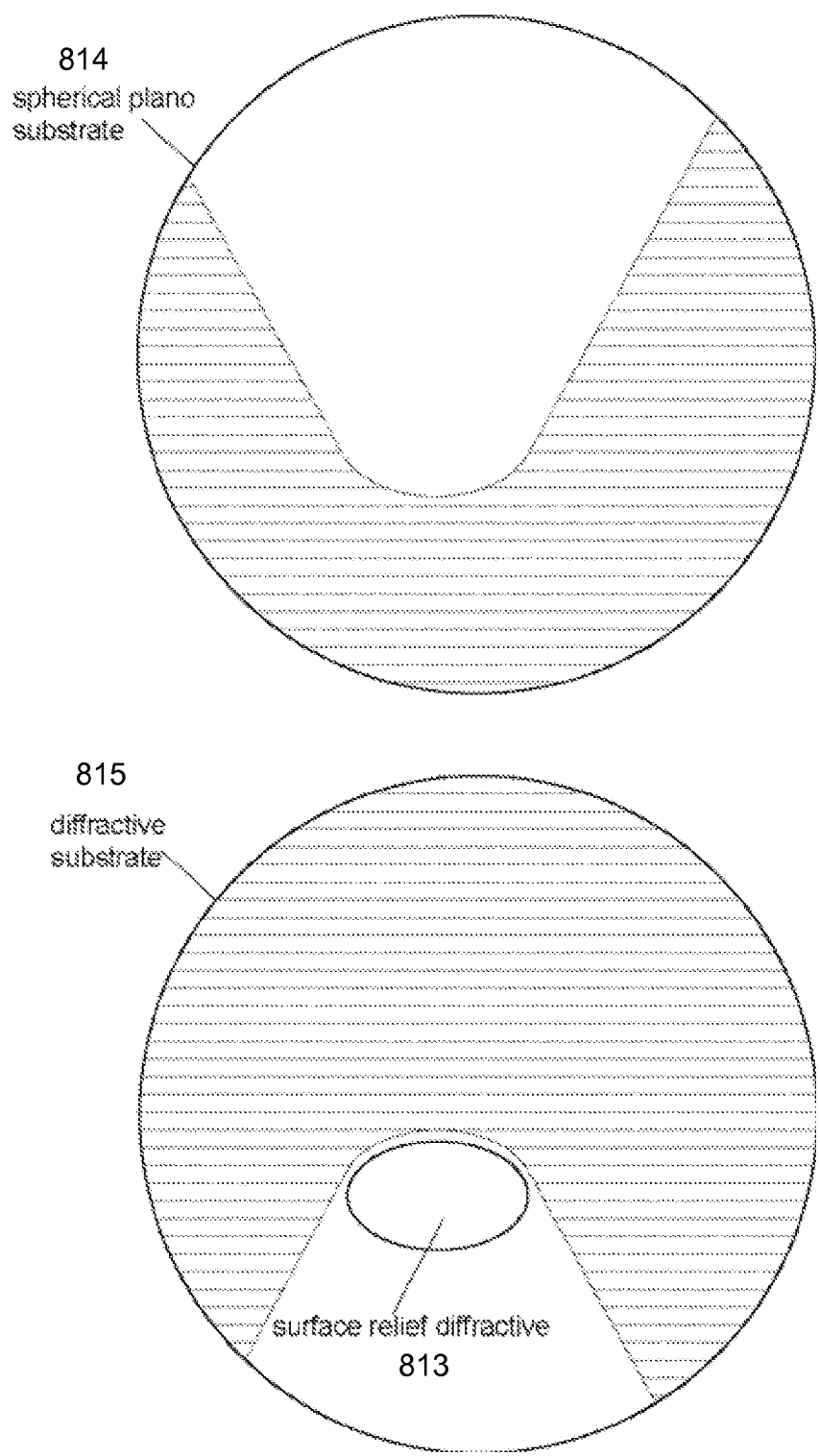
FIG. 9 shows a plan view of another two substrates for a lens product including cut lines according to yet further aspects of the invention.

To achieve this, a cutting pattern, similar to that shown in FIG. 9 may be adopted. In this pattern only small regions at the top and bottom of the substrates 814, 815 would allow electrical connection to the EA region (around surface relief diffractive 813) and everywhere else would be fully isolated. In the example shown in FIG. 9, a portion (which may be a majority) of the "upper" region on the first substrate 814 is not cut, allowing electrical conductivity from the upper edge of the lens, whereas the majority of the "lower" region is cut (into bands) to isolate the first substrate from the lower edge of the frame.

On the second substrate 815, a portion (which may be a majority of) the "lower" region on the is not cut, allowing electrical conductivity from the lower edge of the lens, whereas the majority of the "upper" region is cut (into bands) to isolate the second substrate from the lower edge of the frame.

An EASFB of this "electrode-less" design would be highly desirable as it would eliminate at least one step from the manufacturing process (i.e. forming of the additional electrodes), improve cosmetic yields and product cosmetics overall, eliminate the need for conductive primers and paints to be applied to the lenses at the wholesale laboratory, and relax restrictions on lens fitting mandated by the fact that the electrodes are of finite size. Thus, in embodiments, the lens may be configured to electrically connect to a lens frame throughout an extent of the "uncut" portion of the transparent conductive layer(s). It should also be noted that various combinations of the described cutting patterns are possible, including, for example, including one substrate with a discreet electrode and one substrate without a discreet electrode, etc.

Accordingly, aspects of the invention may include methods of forming lenses such as shown in FIGS. 1-3, with a step of cutting the regions of the transparent conductive material not required for establishing an electrical connection between the peripheral edge and the electro-active region, and without steps related to forming electrodes 106, 107.

Operational steps for forming lenses in accordance with aspects of the invention may include one or more of providing a first substrate, providing a hard coating over the substrate, providing a first transparent conductive layer, and a first insulating layer, over the first substrate, and cutting the first transparent conductive layer to form regions required for establishing an electrical connection between the peripheral edge of the lens and an electro-active region of the lens, and regions not required for establishing an electrical connection between the peripheral edge of the lens and an electro-active region of the lens. A step of cutting the regions not required for establishing an electrical connection (e.g. cutting the region into a plurality of band-shaped sections) may also be included. This method may be performed with, or without, forming a separate electrode structure in contact with the first transparent conductive layer.

Further steps may include one or more of forming an electro-active element over the first insulating layer and the first transparent conductive layer, forming a second insulating layer and a second transparent conductive layer over the electro-active element, and cutting the second transparent conductive layer to form regions required for establishing an electrical connection between the peripheral edge of the lens and an electro-active region of the lens, and regions not required for establishing an electrical connection between the peripheral edge of the lens and an electro-active region of the lens. A step of cutting the regions not required for establishing an electrical connection (e.g. cutting the region into a plurality of band-shaped sections) may also be included. This method may be performed with, or without, forming a separate electrode structure in contact with the second transparent conductive layer.

Further steps may include one or more of forming a second hard coating over the second insulating layer and the second transparent conductive layer, and forming a second substrate over the second hard coating.

Although described in terms of a sequence, sometimes including "above" and "below," for ease of reference and description, the described methods are not limited to only such sequences and relative relationships, and may include variations which will be apparent to those of skill in the art. For example, various of the above layers may be separately formed into "sub-assemblies" that are later joined together, such as by adhesives, and other methods known to those of skill in the art. In one particular embodiment, a first sub-assembly including at least the first substrate, the pre-cut first transparent conductive layer, and the first insulating layer, may be joined to a second sub-assembly including at least the second substrate, the pre-cut second transparent conductive layer, and the second insulating layer. Other variations are also possible.

An EASFLB such as those described herein can be further processed into a finished spectacle lens. Specifically, an EASFLB can be modified to meet the optical power requirements of a specific user and can be edged in a manner suitable for mounting in a spectacle frame. The spectacle frame can be equipped with corresponding electronics for governing operation of the dynamic, electro-active, diffractive optical power region.

As a first step, a specific user's distance vision prescription can be formed into the back surface of the EASFLB. The user's distance prescription can be formed into the back surface using known methods including conventional grinding and polishing or digital surfacing and polishing (i.e., free forming). When a user's distance prescription is formed into the back surface of the EASFLB, the EASFLB can be considered to be an electro-active finished lens blank or EAFLB in accordance with an aspect of the present invention.

In accordance with an aspect of the invention, a convex surface of the front substrate of the EASFLB may not comprise the progressive optical power region. Instead, a progressive optical power region can be introduced on the back surface of the EASFLB via free forming (e.g., along with the user's distance vision prescription) as will be appreciated by one skilled in the relevant arts. Further, in accordance with an aspect of the present invention, the EASFLB can include a first progressive optical power region on a front surface of the EASFLB (e.g., formed by mold or by free-forming) and a second progressive optical power region formed on a back surface of the EASFLB (e.g., formed by mold or by free-forming).

After surfacing and polishing the posterior surface of EASFLB to form an EAFLB in accordance with the present invention, both surfaces of the EAFLB can receive a series of coatings including, but not limited to, scratch resistance coatings, anti-reflection coatings, anti-soiling coatings and cushion coatings, for example.

The surfaced, polished, and coated EASFLB—as an EAFLB—can subsequently be edged to fit into a spectacle frame.

As mentioned previously, a lens according to the present invention can include a peripheral edge. In some embodiments, a conductive paint, ink, or adhesive can be applied to the peripheral edge of the lens which can facilitate electrical connection at the edge of the lens via blunt contact pins or conductive elastomer pads for activation of dynamic, electro-active, diffractive optical power region.

In accordance with an aspect of the present invention, transparent conductors of the lens can be electrically connected to a controller (not shown) via discreetly formed electrodes and/or via conductive layers. The controller can be located on a frame holding or containing an EASFLB that has been processed to fit the frame (e.g., a finished lens). The controller can apply voltages to the transparent conductors predetermined to cause an electric field to form across the electro-active material as well as the alignment layers. The electric field can change the orientation of the molecules of the electro-active material, thereby changing the refractive index of the electro-active material.

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Although many embodiments were described above as comprising different features and/or combination of features, a person of ordinary skill in the art after reading this disclosure may understand that in some instances, one or more of these components could be combined with any of the components or features described above. That is, one or more features from any embodiment can be combined with one or more features of any other embodiment without departing from the scope of the invention.

As noted previously, all measurements, dimensions, and materials provided herein within the specification or within the figures are by way of example only.

A recitation of "a," "an," or "the" is intended to mean "one or more" unless specifically indicated to the contrary.

As used herein, reference to a "first" or a "second" does not limit the referenced component to a particular location unless expressly stated. For instance, reference to a "first temple" may comprise the temple located on either the left side or the right side of a wearer's head.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

What is claimed is:

1. A device, comprising:
   an electro-active optical element, the electro-active element comprising:
   a peripheral edge;
   a discrete electro-active region;
   a first layer of conductive material comprising:
      a first region electrically connected to the electro-active region, and
      a second region electrically isolated from the first region and from the electro-active region;

a first electrode having an end on the peripheral edge, wherein:
 the electrode is apart from the electro-active region,
 the electrode is electrically connected to the first region, and
 the electrode is configured to apply voltage to the discrete electro-active region via the first region.

2. The device of claim 1, wherein the device is the electro-active optical element.

3. The device of claim 1, wherein the second region is electrically isolated from the first region and from the electro-active region by cutting.

4. The device of claim 1, wherein the first region is required for establishing an electrical connection between the peripheral edge and the electro-active region, and the second region is not required for establishing the electrical connection.

5. The device of claim 1, further comprising:
 a second layer of conductive material comprising:
  a third region electrically connected to the electro-active region, and
  a fourth region electrically isolated from the third region and from the electro-active region;
 a second electrode having an end on the peripheral edge, wherein;
  the electrode is apart from the electro-active region,
  the electrode is electrically connected to the third region, and
  the electrode is configured to apply voltage to the discrete electro-active region via the third region.

6. The device of claim 1, further comprising:
 a first substrate, wherein the first layer of conductive material and the first electrode are disposed on the first substrate,
 a second substrate, wherein the second layer of conductive material and the second electrode are disposed on the second substrate; and
 wherein;
  the first region is formed around the first electrode on the first substrate, and
  the third region is formed around the second electrode on the second substrate.

7. The device of claim 1, wherein;
 the first electrode is inside the first region, and
 the second electrode is inside the third region.

8. The device based on claim 1, wherein:
 the second region is formed at the peripheral edge of the first substrate by cutting the first layer of conductive material, and
 the fourth region is formed at the peripheral edge of the second substrate by cutting the second layer of conductive material.

9. The device based on claim 1, wherein:
 the first electrode extends toward the discrete electro-active region from the peripheral edge, and
 the second electrode extends toward the discrete electro-active region from the peripheral edge.

10. The device of claim 1, wherein the electro-active optical element is a lens.

11. The device of claim 1, wherein the device is eyewear and wherein the electro-active optical element is a part of the eyewear.

12. The device of claim 1, wherein the conductive material is a transparent conductive material.

13. The device based on claim 3, wherein the cutting is accomplished with cuts less than 1 mm wide.

14. The device of claim 5, wherein;
 a refractive index of the discrete electro-active region is changed by applying voltage to the discrete electro-active region via the first layer of conductive material, and
 the refractive index of the discrete electro-active region is changed by applying voltage to the discrete electro-active region via the second layer of conductive material.

15. The device of claim 5, wherein the device further comprises:
 an electro-active lens having a peripheral edge;
 the discrete electro-active region;
 the first layer of conductive material comprising:
  the first region electrically connected to the electro-active region, and
  the second region electrically isolated from the first region and from the electro-active region;
 the first electrode having an end on the peripheral edge, wherein:
  the electrode is apart from the electro-active region,
  the electrode is electrically connected to the first region, and
  the electrode is configured to apply voltage to the discrete electro-active region via the first region;
 a controller to apply voltage to the layer of conductive material, wherein:
  the second region is electrically isolated from the first region and from the electro-active region by cutting the first layer of conductive material, and
  the fourth region is electrically isolated from the third region and from the electro-active region by cutting the second layer of conductive material;
  the second region is cut into separate electrically isolated bands, and
  the fourth region is cut into separate electrically isolated bands.

16. The device of claim 15, wherein the device further comprises at least one of a power source, a switch, a sensor, a transmitter, a receiver, a transceiver, a light, a filter, a microphone, a camera, and a display.

17. The device of claim 15, wherein the device is a pair of eyeglasses.

18. A method of manufacturing an electro-active optical element comprising:
 a peripheral edge;
 a discrete electro-active region;
 a layer of conductive material comprising:
  a first region electrically connected to the electro-active region, and
  a second region electrically isolated from the first region and from the electro-active region;
 an electrode having an end on the peripheral edge, wherein;
  the electrode is apart from the electro-active region,
  the electrode is electrically connected to the first region, and
  the electrode is configured to apply voltage to the discrete electro-active region via the first region;
 the method comprising:
  cutting the layer of conductive material to electrically isolate the first region from the second region.

19. The method of claim 18, wherein the cutting is laser cutting.

20. The method of claim 18, wherein the second region is cut into separate electrically isolated bands.

* * * * *